US00RE42364E

(19) United States
(12) Reissued Patent
Hayakawa

(10) Patent Number: US RE42,364 E
(45) Date of Reissued Patent: May 17, 2011

(54) OCCUPANT KNEE PROTECTION SYSTEM FOR VEHICLE AND INFLATING AND DEPLOYING METHOD

(75) Inventor: Tatsuya Hayakawa, Toyota (JP)

(73) Assignee: Toyota Jidosha Kabushiki Kaisha, Toyota (JP)

( * ) Notice: This patent is subject to a terminal disclaimer.

(21) Appl. No.: 12/314,019

(22) PCT Filed: Nov. 27, 2002

(86) PCT No.: PCT/IB02/05039

§ 371 (c)(1),
(2), (4) Date: Jun. 14, 2004

(87) PCT Pub. No.: WO03/049977

PCT Pub. Date: Jun. 19, 2003

Related U.S. Patent Documents

Reissue of:
(64) Patent No.: 7,147,247
Issued: Dec. 12, 2006
Appl. No.: 10/495,867
Filed: Jun. 14, 2004

(30) Foreign Application Priority Data

Dec. 10, 2001 (JP) ..... 2001-375389

(51) Int. Cl.
*B60R 21/26* (2006.01)

(52) U.S. Cl. ..... 280/740; 280/742

(58) Field of Classification Search ..... 280/729, 280/730.1, 732, 740, 742, 743.1, 743.2, 751–753
See application file for complete search history.

(56) References Cited

U.S. PATENT DOCUMENTS 4,265,468 A 5/1981 Suszko et al.
4,290,627 A 9/1981 Cumming et al.
5,458,366 A 10/1995 Hock et al.
(Continued)

FOREIGN PATENT DOCUMENTS

GB 2 265 118 A 9/1993
(Continued)

OTHER PUBLICATIONS

Jan. 5, 2010 Office Action in U.S. Appl. No. 12/585,621.
(Continued)

*Primary Examiner* — Paul N. Dickson
*Assistant Examiner* — Laura Freedman
(74) *Attorney, Agent, or Firm* — Oliff & Berridge, PLC

(57) ABSTRACT

An occupant knee protection system for a vehicle (10) has an airbag (11), which is folded and stored in a part of a vehicle, inflate and deploy in front of the occupant's knees by gas supplied from an inflator (12), so as to protect the occupant's knees. The airbag (11) has in its inside a tether (11c) (gas flow dividing portion whose front and rear end portions are connected to front and rear walls (11a, 11b) of the airbag (11), both walls being arranged in a longitudinal direction of the vehicle, so as to appropriately regulate a longitudinal thickness (D) of the airbag (11)) for dividing a gas flow from the inflator (12) in right and left directions of the vehicle.

55 Claims, 5 Drawing Sheets

U.S. PATENT DOCUMENTS

| | | | | |
|---|---|---|---|---|
| 5,505,485 | A | 4/1996 | Breed | |
| 5,513,877 | A * | 5/1996 | MacBrien et al. | 280/732 |
| 5,536,043 | A | 7/1996 | Lang et al. | |
| 5,577,765 | A | 11/1996 | Takeda et al. | |
| 5,593,179 | A | 1/1997 | Maruyama | |
| 5,683,109 | A | 11/1997 | Birman | |
| 5,738,368 | A | 4/1998 | Hammond et al. | |
| 5,845,935 | A | 12/1998 | Enders et al. | |
| 5,913,535 | A | 6/1999 | Taguchi et al. | |
| 6,086,092 | A | 7/2000 | Hill | |
| 6,155,595 | A | 12/2000 | Schultz | |
| 6,170,871 | B1 | 1/2001 | Goestenkors et al. | |
| 6,176,512 | B1 | 1/2001 | Rodriguez | |
| 7,182,365 | B2 * | 2/2007 | Takimoto et al. | 280/730.1 |
| 2001/0040368 | A1 | 11/2001 | Okada et al. | |
| 2002/0149187 | A1 | 10/2002 | Holtz et al. | |

FOREIGN PATENT DOCUMENTS

| | | |
|---|---|---|
| JP | A 11-152004 | 6/1999 |
| JP | A-11-152004 | 6/1999 |
| JP | A-11-321539 | 11/1999 |
| JP | A 11-321539 | 11/1999 |
| JP | A-2000-225911 | 8/2000 |
| JP | A 2000-225911 | 8/2000 |
| WO | WO 00/32447 | 6/2000 |

OTHER PUBLICATIONS

Oct. 27, 2010 Office Action in U.S. Appl. No. 12/585,621.

* cited by examiner

OCCUPANT KNEE PROTECTION SYSTEM FOR VEHICLE AND INFLATING AND DEPLOYING METHOD

Matter enclosed in heavy brackets [ ] appears in the original patent but forms no part of this reissue specification; matter printed in italics indicates the additions made by reissue.

*This is one of two reissue applications of U.S. Pat. No. 7,147,247. The present reissue application Ser. No. 12/314,019 was filed Dec. 2, 2008, and the other reissue application is a reissue divisional of this U.S. reissue application and is U.S. application Ser. No. 12/585,621 filed Sep. 18, 2009.*

BACKGROUND OF THE INVENTION

1. Field of the Invention

The invention relates to an airbag system and inflating and deploying method of the airbag, provided in a vehicle, more particularly to an occupant knee protection system for a vehicle (knee airbag system) which protects occupant's knees by inflating and deploying an airbag (sometimes called as a gas bag), which is folded and stored in a part of the vehicle, in front of the occupant's knees by gas supplied from an inflator.

2. Description of the Related Art

A related art of the occupant knee protection system for a vehicle is disclosed in, for example, the Japanese Patent Laid-Open Publication No. 11-321539. This publication discloses an occupant knee protection system for a vehicle in which opposed wall portions (front wall portion and rear wall portion) of an airbag are connected via connecting means so as to suppress the shape change of the airbag in a case the occupant's knees smash into the airbag.

SUMMARY OF THE INVENTION

According to the aforementioned related art of the occupant knee protection system for a vehicle, the shape change of the airbag when the occupant's knees smash into the airbag can be suppressed by the connecting means provided in the airbag. However, since the airbag itself inflates in a spherical shape at the time of inflation and deployment, the airbag may be inflated into a large size in between both knees (between legs) of the occupant, thereby making it difficult for the airbag to gets in front of both left and right knees of the occupant.

[Means for Solving Problem]

To solve the problem stated above, the invention is characterized in that, in the occupant knee protection system for a vehicle which protects occupant's knees by inflating and deploying an airbag, which is folded and stored in a part of the vehicle, in front of the occupant's knees by gas supplied from an inflator, gas flow dividing portion for dividing a flow of the gas supplied from the inflator in right and left directions of the vehicle is provided inside the airbag.

In this case, it is preferable that the gas flow dividing portion is formed in a predetermined length in a longitudinal direction of the vehicle, and both front and rear end portions of the gas flow dividing portion are connected, respectively, to front and rear walls of the airbag that are arranged in the longitudinal direction of the vehicle. In addition, the gas flow from the inflator runs in a vertical direction of the vehicle, and therefore the gas flow dividing portion is preferably formed in a mountain-like shape that protrudes against the gas flow from the inflator. Furthermore, it is preferable that the gas flow dividing portion has communicating portion for communicating between. one area and the other area within the airbag, both areas being separated by the gas flow dividing portion.

With the occupant knee protection system for a vehicle according to the invention, introduction of the gas can be facilitated while distributing the gas within the airbag in left and right directions of the vehicle by the gas flow dividing portion. As a result, inflation and deployment of the airbag at its center portion (airbag inflation in a spherical shape) is suppressed, thereby improving the inflation and deployment performance at both end portions of the air bag in a lateral direction of the vehicle. This arrangement allows the airbag to get in front of the occupant's knees, making it possible to appropriately protect the occupant's knees.

In the occupant knee protection system for a vehicle according to the invention, in addition that the introduction of the gas in left and right directions of the vehicle can be facilitated by the gas flow dividing portion , a longitudinal thickness of the airbag in an inflated and deployed state can be regulated appropriately (in a predetermined length). Therefore, the airbag inflation and deployment can be restricted such that the airbag is not inflated more than required in a longitudinal direction of the vehicle, enabling the airbag to get in front of the occupant's knees easily.

Furthermore, in the occupant knee protection system for a vehicle according to the invention, the gas supplied from the inflator can be distributed quickly and evenly in right and left directions by the gas flow dividing portion. As a result, the inflation and deployment of the airbag in left and right directions in equal amount can be facilitated. In addition, while facilitating the performance of the inflation and deployment of the airbag in right and left directions, the occupant knee protection system for a vehicle according to the invention also enables improvements of the inflation and deployment performance of the entire airbag and an airbag shape retention effect.

DETAILED DESCRIPTION OF THE PREFERRED EMBODIMENTS

Figure 1:
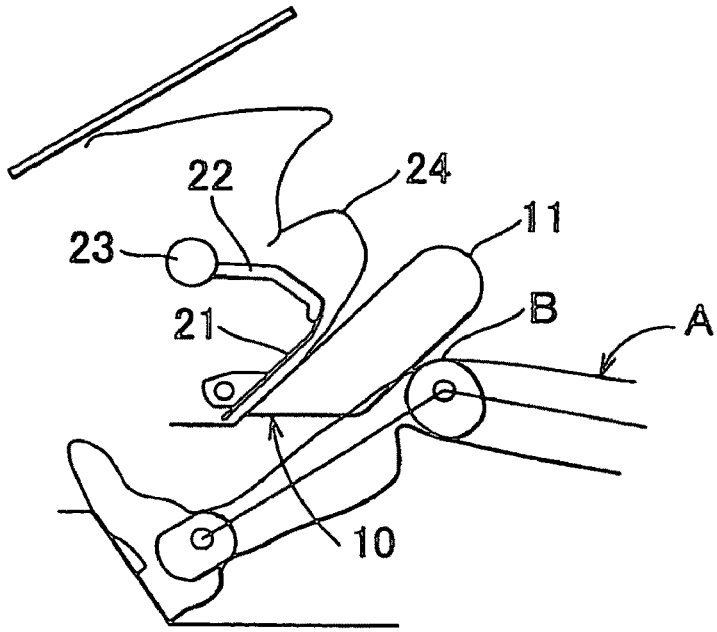
FIG. 1 is a side view which schematically shows one embodiment of an occupant knee protection system for a vehicle according to the invention.
Figure 2:
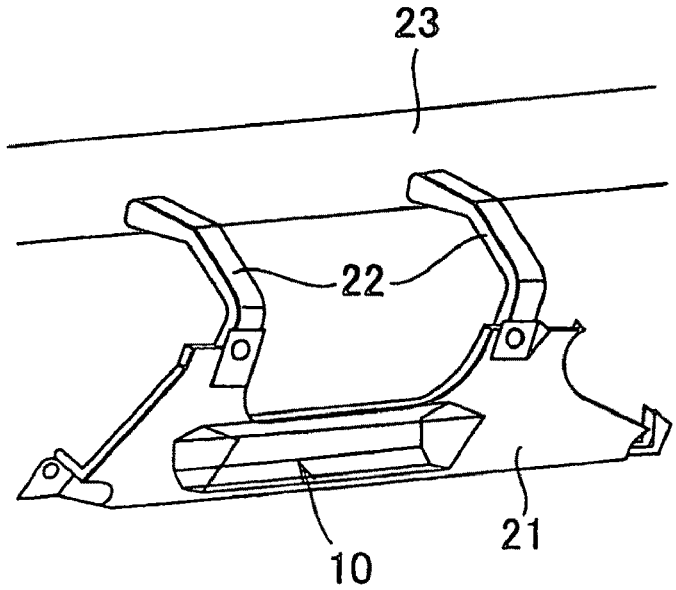
FIG. 2 is a perspective view showing relationships of a panel, a bracket, an instrument panel reinforcement, and the occupant knee protection system for a vehicle in FIG. 1.
Figure 3:
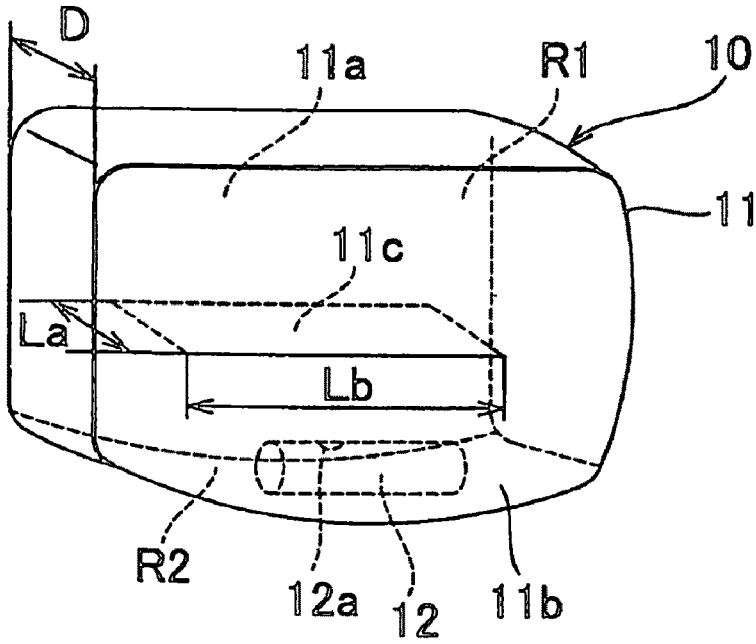
FIG. 3 is a perspective view of an inflated and deployed state of an airbag of the occupant knee protection system for a vehicle in FIG. 1.
Figure 4:
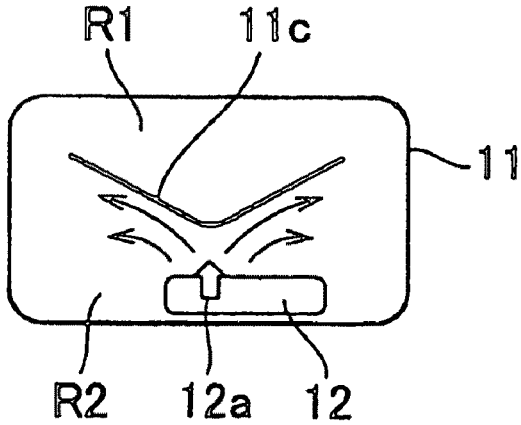
FIG. 4 is a longitudinal center sectional view from the rear which schematically shows a first modified embodiment of the occupant knee protection system for a vehicle according to the invention.
Figure 5:
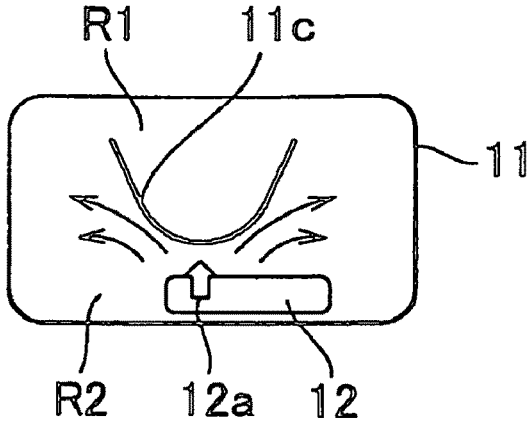
FIG. 5 is a longitudinal center sectional view from the rear which schematically shows a second modified embodiment of the occupant knee protection system for a vehicle according to the invention.

Exemplary embodiments according to the invention will be described hereinafter with reference to accompanying drawings. FIGS. 1 to 3 show one embodiment of an occupant knee protection system for a vehicle according to the invention. An occupant knee protection system (knee airbag system) 10 in the embodiment is assembled to an instrument panel reinforcement 23 via a panel 21 and a bracket 22 at approximately the same height as a knee B of an occupant A. Furthermore, the occupant knee protection system 10 is provided with an airbag 11 which inflates and deploys in front of the knee B of the occupant A, and an inflator 12 which supplies gas to the airbag 11.

The airbag 11 is made of a woven fabric and is folded and stored inside an instrument panel 24. The airbag 11 intervenes between the panel 21 and the knee B of the occupant A at the time of inflation and deployment as shown in FIG. 1 so as to protect the knee B of the occupant A. Furthermore, as shown in FIG. 3, the airbag 11 has in its inside a tether 11c for connecting a front wall 11a and a rear wall 11b of the airbag 11 that are arranged in a longitudinal direction of the vehicle, and is supported on the panel 21 via the front wall 11a.

The tether 11c is a rectangular woven fabric formed in predetermined lengths of La and Lb in longitudinal and lateral directions of the vehicle, respectively. The front and rear end portions of the tether 11c are connected to (for example, sewn to) the front and rear walls 11a, 11b of the airbag 11 that are arranged in the longitudinal direction of the vehicle. The tether 11c extends in longitudinal and lateral directions above a gas supply hole 12a of an inflator 12, so as to form a pair of inflating chambers R1, R2 arranged one on top of the other within the airbag 11, both chambers being communicated with each other at the right and left end portions of the tether 11c. In addition, the tether 11c functions as a connecting means for connecting the front and rear walls 11a, 11b of the airbag 11 that are arranged in the longitudinal direction of the vehicle, and also as gas flow dividing portion for dividing the gas flow from the inflator 12 in right and left directions of the vehicle.

The inflator 12 injects and supplies gas into the airbag 11 upon a frontal collision of the vehicle, and is incorporated in the airbag 11 to be supported on the panel 21 together with the airbag 11. Furthermore, the inflator 12 has the gas supply hole 12a for injecting and supplying the gas towards a bottom face of the tether 11c (i.e. injecting the gas upward).

In the occupant knee protection system 10 configured as described above according to the embodiment, the airbag 11 is normally stored inside the instrument panel 24 in a multi-folded state, and covered by a lower portion of the instrument panel 24. Also in this embodiment, gas is supplied from the inflator 12 into the airbag 11 that is stored in the folded state when the acceleration detected by a relevant sensor (not shown) upon the frontal collision of the vehicle reaches or exceeds a set value. As a result, the airbag 11 inflates and deploys by the supplied gas, so as to intervene between the panel 21 and the knee B of the occupant A, thereby protecting the knee B of the occupant A.

Meanwhile, according to this embodiment, introduction of the gas can be facilitated while distributing the gas in right and left directions of the vehicle by the tether 11c within the airbag 11. This suppresses inflation and deployment of the airbag 11 at its center portion (inflation of the airbag 11 in a spherical shape), and thus the inflation and deployment performance of the airbag 11 at both end portions in the lateral direction of the vehicle is improved. Consequently, the airbag 11 is made to promptly get in front of the knee B of the occupant A, making it possible to appropriately protect the knee B of the occupant A.

In the occupant knee protection system for a vehicle 10 according to this embodiment, in addition that the introduction of the gas from the inflator 12 in right and left directions of the vehicle can be facilitated by the tether 11c, a longitudinal thickness D of the airbag 11 in the inflated and deployed state can be regulated appropriately (in a predetermined length La). As a result, the airbag inflation and deployment is restricted such that the airbag 11 is not inflated more than required in the longitudinal direction of the vehicle, thus enabling the airbag to get in front of the knee B of the occupant A easily.

In the aforementioned embodiment, the tether 11c is formed and arranged within the airbag 11 in a tabular shape against the gas flow from the inflator 12. Nonetheless, as illustrated in FIG. 4 or FIG. 5, or FIGS. 6 to 8, the tether 11c may be formed and arranged in a mountain-like shape which protrudes against the gas flow from the inflator 12. In the embodiments shown in FIG. 4 and in FIGS. 6 to 8, the tether 11c is formed and arranged in a mountain-like shape which protrudes in a V-shape against the gas flow from the inflator 12. In the embodiment shown in FIG. 5, the tether 11c is formed and arranged in a mountain-like shape which protrudes in a U-shape against the gas flow from the inflator 12.

In the occupant knee protection system for a vehicle according to each embodiment shown in FIG. 4, FIG. 5, and FIGS. 6 to 8, the gas from the inflator 12 can be distributed quickly and evenly in right and left directions of the vehicle by the tether 11c in the airbag 11. This facilitates the inflation and deployment of the airbag 11 in right and left directions in equal amount.

Figure 6:
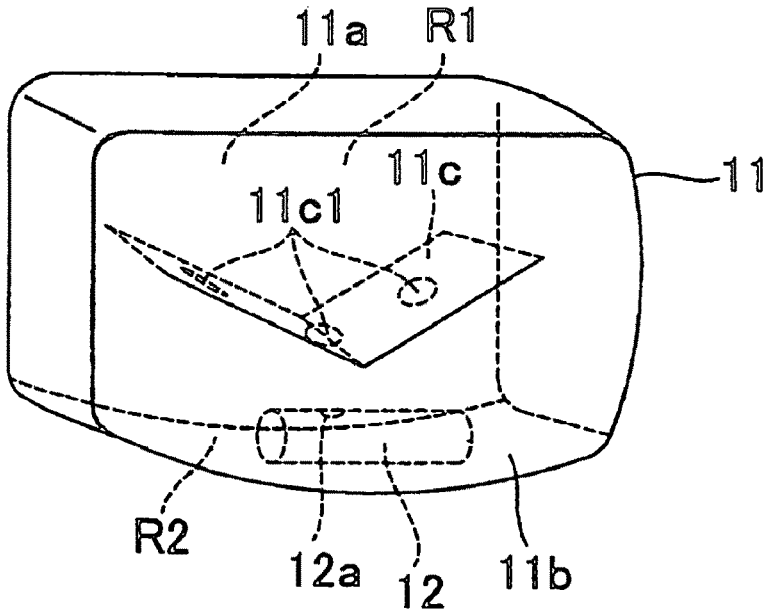
FIG. 6 is a perspective view, equivalent to FIG. 3, which schematically shows another embodiment of the occupant knee protection system for a vehicle according to the invention.
Figure 7:
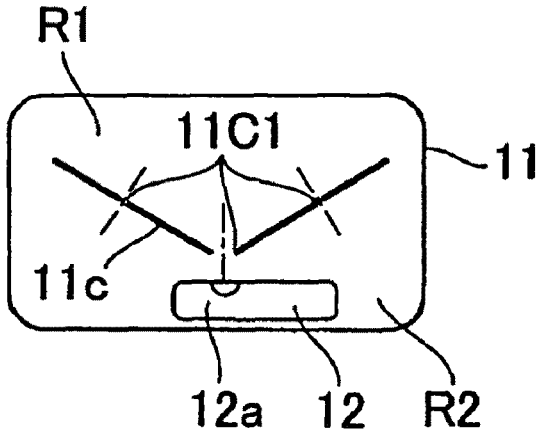
FIG. 7 is a longitudinal center sectional view of the embodiment shown in FIG. 6 from the rear.
Figure 8:
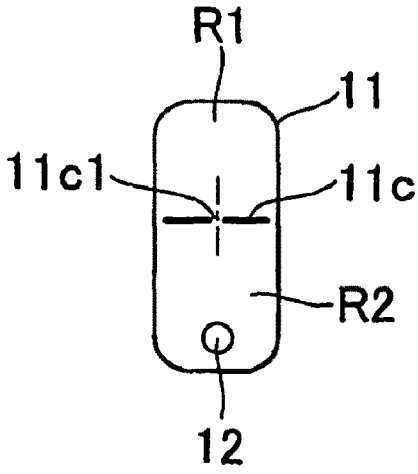
FIG. 8 is a longitudinal center sectional view of the embodiment shown in FIG. 6 from the side.

Furthermore, in the occupant knee protection system for a vehicle according to the embodiment shown in FIGS. 6 to 8, the tether 11c is provided with three communicating holes 11c1 which communicate between an inflating chamber (one area) R1 and an inflating chamber (the other area) R2 within the airbag 11, both chambers being separated by the tether 11c. Due to this arrangement, the occupant knee protection system for a vehicle according to this embodiment can facilitate the inflation and deployment performance of the airbag 11 in the lateral direction, and at the same time, can improve the inflation and deployment performance of the entire airbag 11 as well as a shape retention effect of the airbag 11.

In each of the aforementioned embodiments, the inflator 12 is provided in the lower part in the airbag 11 such that the inflator 12 injects and supplies gas in an upward direction of the vehicle. However, the inflator may be provided in the upper part in the airbag such that the inflator injects and supplies gas in a downward direction of the vehicle. In this case, if the same structure as that in each embodiment in FIGS. 4 to 8 is adopted, the tether is formed and arranged in a mountain-like shape which protrudes upward.

Figure 9:
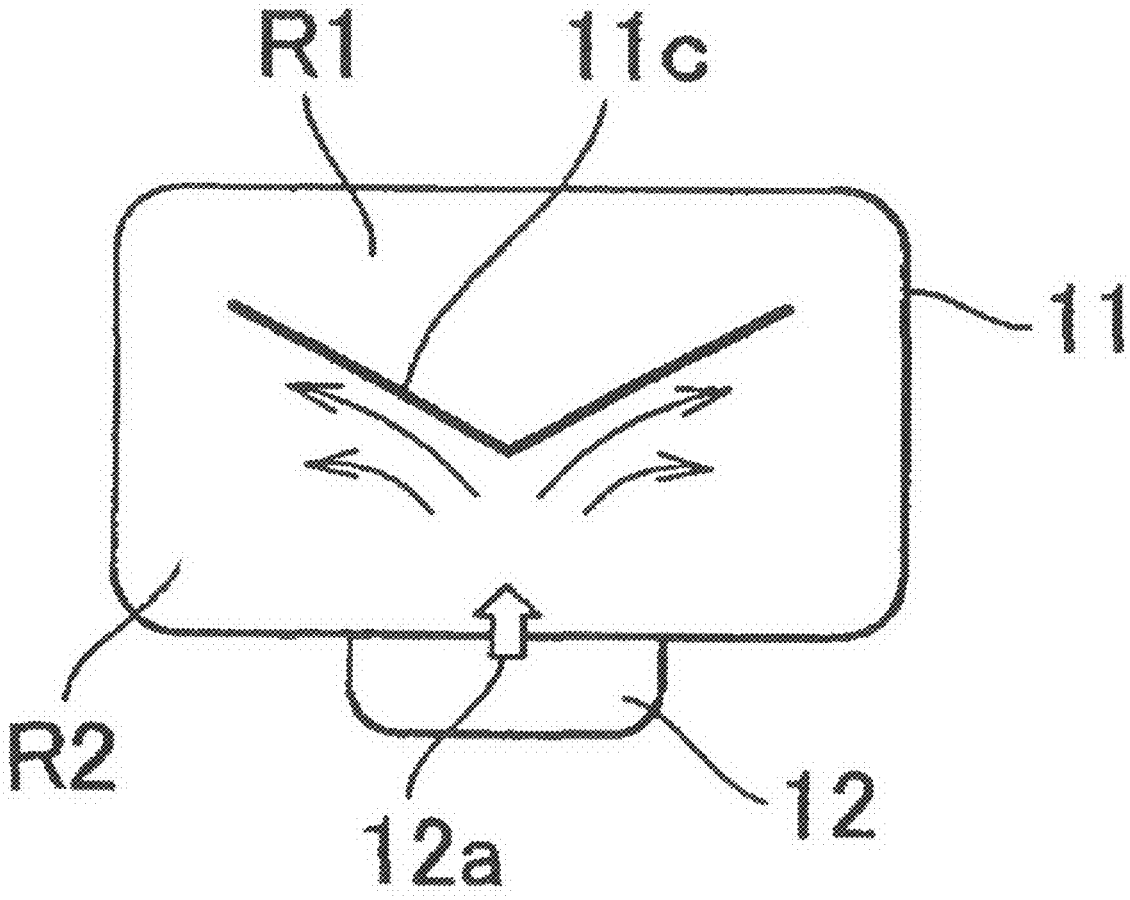
FIG. 9 is a longitudinal center sectional view from the rear which schematically shows a second modified embodiment of the occupant knee protection system for a vehicle in which an inflator is provided outside the airbag.

Furthermore, in each of the embodiments described above, the invention is carried out in the embodiment in which the inflator 12 is provided inside the airbag 11. However, as shown in FIG. 9, the invention may be carried out in an embodiment in which the inflator is provided outside the airbag, in the same manner as in or with the appropriate modifications to the aforementioned embodiments.

The invention claimed is:

1. An occupant knee protection system for a vehicle, comprising:

an inflator;

an airbag which is folded and stored in a part of the vehicle, that is inflated and deployed in front of knees of an occupant by a gas supplied [form] *from* the inflator for protecting knees of the occupant; and a gas flow dividing portion that divides a gas flow from the inflator in right and left directions of the vehicle is provided inside the airbag, characterized in that:

the gas flow dividing portion is formed in a predetermined length in a longitudinal direction of the vehicle, front and rear end portions of the gas flow dividing portion being connected to front and rear walls, that are arranged in the longitudinal direction of the vehicle, of the airbag, that the inflator is disposed at an upper end portion or *a* lower end portion of the airbag as viewed in the vertical direction of the vehicle, and that a direction of the gas flow from the inflator is in a vertical direction of the vehicle, and the gas flow dividing portion is formed in a mountain shape which protrudes against the gas flow from the inflator.

2. The occupant knee protection system for a vehicle according to claim 1, characterized in that:

the mountain shape is formed and arranged so as to protrude in a V-shape.

3. The occupant knee protection system for a vehicle according to claim 1, characterized in that:

the mountain shape is formed and arranged so as to protrude in a U-shape.

4. The occupant knee protection system for a vehicle according to claim 1, characterized in that:

the gas flow dividing portion is a tether made of a woven fabric.

5. The occupant knee protection system for a vehicle according to claim 1, characterized in that:

the gas flow dividing portion has *a* communicating portion that communicates between one area and an other area within the airbag, both areas being separated by the gas flow dividing portion.

6. The occupant knee protection system for a vehicle according to claim 5, characterized in that:

the communicating portion is a communicating hole provided on the gas flow dividing portion.

7. The occupant knee protection system for a vehicle according to claim 1, characterized in that:

the inflator is provided inside the airbag.

8. The occupant knee protection system for a vehicle according to claim 1, characterized in that:

the inflator is provided outside the airbag.

9. An inflating and deploying method of an airbag of an occupant knee protection system for a vehicle by supplying a gas from an inflator, comprising the [step] *steps* of:

inflating the airbag by the inflator;

dividing a gas flow from the inflator in right and left directions of the vehicle by a dividing portion; [and]

deploying the airbag characterized by comprising the step of:

forming the gas flow dividing portion in a predetermined length in a longitudinal direction of the vehicle and thereby connecting front and rear end portions of the gas flow dividing portion to front and rear walls, that are arranged in the longitudinal direction of the vehicle, of the airbag, and disposing the inflator at an upper end portion or lower end portion of the airbag as viewed in the vertical direction of the vehicle, and directing the gas flow from the inflator in a vertical direction of the vehicle, and forming the gas flow dividing portion in a mountain shape which protrudes against the gas flow from the inflator.

10. The inflating and deploying method of an airbag according to claim 9, characterized in that:

the dividing portion is formed and arranged so as to protrude in a V-shape.

11. The inflating and deploying method of an airbag according to claim 9, characterized in that:

the dividing portion is formed and arranged so as to protrude in a U-shape.

12. The inflating and deploying method of an airbag according to claim 9, characterized by further comprising the step of:

connecting between one area and an other area within the airbag, both areas being separated by the gas flow dividing portion.

*13. An occupant knee protection system for a vehicle, comprising:*

*an inflator;*

*an airbag that is folded and stored in a part of the vehicle, that is inflated and deployed in front of knees of an occupant by a gas supplied from the inflator for protecting knees of the occupant; and*

*a gas flow dividing portion that divides a gas flow from the inflator in right and left directions of the vehicle and that is provided inside the airbag, wherein:*

*the gas flow dividing portion is formed in a predetermined length in a longitudinal direction of the vehicle, first and second end portions of the gas flow dividing portion being connected to first and second walls, that are arranged in the longitudinal direction of the vehicle, of the airbag,*

*the inflator is disposed at an uppermost end or a lowermost end of the airbag as viewed in the vertical direction of the vehicle,*

*the gas flow dividing portion is formed in a predetermined length in a lateral direction of the vehicle,*

*upon deployment, the airbag directly contacts the knees of the vehicle occupant, and the gas flow dividing portion suppresses inflation of the airbag in between both knees of the vehicle occupant.*

*14. The occupant knee protection system for a vehicle according to claim 13, wherein:*

*the gas flow dividing portion is a tether made of a woven fabric.*

*15. The occupant knee protection system for a vehicle according to claim 13, wherein:*

*the gas flow dividing portion has a communicating portion that communicates between one area and an other area within the airbag, both areas being separated by the gas flow dividing portion.*

*16. The occupant knee protection system for a vehicle according to claim 15, wherein:*

*the communicating portion is a communicating hole provided on the gas flow dividing portion.*

*17. The occupant knee protection system for a vehicle according to claim 13, wherein:*

*the inflator is disposed vertically below the gas flow dividing portion.*

*18. An occupant knee protection system for a vehicle, comprising:*

*an inflator;*

*an airbag that is folded and stored in a part of the vehicle, that is inflated and deployed in front of knees of an occupant by a gas supplied from the inflator for protecting knees of the occupant; and*

*a gas flow dividing portion that divides a gas flow from the inflator in right and left directions of the vehicle and that is provided inside the airbag, wherein:*

*the gas flow dividing portion is formed in a predetermined length in a longitudinal direction of the vehicle, first and second end portions of the gas flow dividing portion being connected to first and second walls, that are arranged in the longitudinal direction of the vehicle, of the airbag,*

*the inflator includes a gas supply hole that faces the gas flow dividing portion in a state when the airbag is deployed,*

*the gas flow dividing portion is formed in a predetermined length in a lateral direction of the vehicle,*

*upon deployment, the airbag directly contacts the knees of the vehicle occupant, and the gas flow dividing portion suppresses inflation of the airbag in between both knees of the vehicle occupant.*

*19. The occupant knee protection system for a vehicle according to claim 18, wherein:*

*the gas flow from the inflator directly impinges upon the gas flow dividing portion.*

*20. The occupant knee protection system for a vehicle according to claim 18, wherein:*

*the gas flow dividing portion is a tether made of a woven fabric.*

*21. The occupant knee protection system for a vehicle according to claim 18, wherein:*

*the gas flow dividing portion has a communicating portion that communicates between one area and an other area within the airbag, both areas being separated by the gas flow dividing portion.*

*22. The occupant knee protection system for a vehicle according to claim 21, wherein:*

*the communicating portion is a communicating hole provided on the gas flow dividing portion.*

*23. The occupant knee protection system for a vehicle according to claim 18, wherein:*

*the inflator is disposed vertically below the gas flow dividing portion.*

*24. The occupant knee protection system for a vehicle according to claim 18, wherein:*

*the inflator is disposed at an upper end portion or a lower end portion of the airbag as viewed in the vertical direction of the vehicle.*

*25. An occupant knee protection system for a vehicle, comprising:*

*an inflator;*

*an airbag that is folded and stored in a part of the vehicle, that is inflated and deployed in front of knees of an occupant by a gas supplied from the inflator for protecting knees of the occupant; and*

*a gas flow dividing portion that divides a gas flow from the inflator in right and left directions of the vehicle and that is provided inside the airbag, wherein:*

*the gas flow dividing portion is formed in a predetermined length in a longitudinal direction of the vehicle, first and second end portions of the gas flow dividing portion being connected to first and second walls, that are arranged in the longitudinal direction of the vehicle, of the airbag,*

*the gas flow dividing portion is formed in a predetermined length in a lateral direction of the vehicle,*

*the gas flow from the inflator directly impinges upon the gas flow dividing portion, and*

*upon deployment, the airbag directly contacts the knees of the vehicle occupant, and the gas flow dividing portion suppresses inflation of the airbag in between both knees of the vehicle occupant.*

*26. An occupant knee protection system for a vehicle, comprising:*

*an inflator;*

*an airbag that is folded and stored in a part of the vehicle, that is inflated and deployed in front of knees of an occupant by a gas supplied from the inflator for protecting knees of the occupant; and*

*a gas flow dividing portion that divides a gas flow from the inflator in right and left directions of the vehicle and that is provided inside the airbag, wherein:*

*the gas flow dividing portion is formed in a predetermined length in a longitudinal direction of the vehicle, first and second end portions of the gas flow dividing portion being connected to first and second walls, that are arranged in the longitudinal direction of the vehicle, of the airbag,*

*the gas flow dividing portion is formed in a predetermined length in a lateral direction of the vehicle,*

*the inflator includes a gas supply hole arranged to emit gas in a direction substantially perpendicular to a plane of the gas flow dividing portion in a state when the airbag is deployed, and*

*upon deployment, the airbag directly contacts the knees of the vehicle occupant, and the gas flow dividing portion suppresses inflation of the airbag in between both knees of the vehicle occupant.*

*27. An occupant knee protection system for a vehicle, comprising:*

*an inflator;*

*an airbag that is folded and stored in a part of the vehicle, that is inflated and deployed in front of knees of an occupant by a gas supplied from the inflator for protecting knees of the occupant; and*

*a gas flow dividing portion that divides a gas flow from the inflator in right and left directions of the vehicle and that is provided inside the airbag, wherein:*

*the gas flow dividing portion is formed in a predetermined length in a longitudinal direction of the vehicle, first and second end portions of the gas flow dividing portion being connected to first and second walls, that are arranged in the longitudinal direction of the vehicle, of the airbag,*

*the inflator is disposed at an upper end portion or a lower end portion of the airbag as viewed in the vertical direction of the vehicle,*

*the gas flow dividing portion is formed in a predetermined length in a lateral direction of the vehicle,*

*a direction of the gas flow from the inflator is in a vertical direction of the vehicle, and*

*upon deployment, the airbag directly contacts the knees of the vehicle occupant, and the gas flow dividing portion suppresses inflation of the airbag in between both knees of the vehicle occupant.*

*28. An occupant knee protection system for a vehicle, comprising:*

*an inflator;*

*an airbag that is folded and stored in a part of the vehicle, that is inflated and deployed in front of knees of an occupant by a gas supplied from the inflator for protecting knees of the occupant; and*

*a gas flow dividing portion that divides a gas flow from the inflator in right and left directions of the vehicle and that is provided inside the airbag, wherein:*

*the gas flow dividing portion is formed in a predetermined length in a longitudinal direction of the vehicle,*

*first and second end portions of the gas flow dividing portion being connected to first and second walls, that are arranged in the longitudinal direction of the vehicle, of the airbag,*

*the inflator is disposed at an upper end portion or a lower end portion of the airbag as viewed in the vertical direction of the vehicle;*

*the gas flow dividing portion is formed in a planar surface,*

*the gas flow from the inflator directly impinges upon the gas flow dividing portion, and*

*upon deployment, the airbag directly contacts the knees of the vehicle occupant, and the gas flow dividing portion suppresses inflation of the airbag in between both knees of the vehicle occupant.*

*29. The occupant knee protection system for a vehicle according to claim 28, wherein:*

*the gas flow dividing portion is a tether made of a woven fabric.*

*30. The occupant knee protection system for a vehicle according to claim 28, wherein:*

*the gas flow dividing portion has a communicating portion that communicates between one area and an other area within the airbag, both areas being separated by the gas flow dividing portion.*

*31. The occupant knee protection system for a vehicle according to claim 28, wherein:*

*the inflator is disposed vertically below the gas flow dividing portion.*

*32. The occupant knee protection system for a vehicle according to claim 28, wherein:*

*the gas flow dividing portion is formed in a tabular shape.*

*33. The occupant knee protection system for a vehicle according to claim 28, wherein:*

*the gas flow dividing portion is formed in a rectangular shape.*

*34. An occupant knee protection system for a vehicle, comprising:*

*an inflator;*

*an airbag that is folded and stored in a part of the vehicle, that is inflated and deployed in front of knees of an occupant by a gas supplied from the inflator for protecting knees of the occupant; and*

*a gas flow dividing portion that divides a gas flow from the inflator in right and left directions of the vehicle and that is provided inside the airbag, wherein:*

*the gas flow dividing portion is formed in a predetermined length in a longitudinal direction of the vehicle, front and rear end portions of the gas flow dividing portion being connected to front and rear walls, that are arranged in the longitudinal direction of the vehicle, of the airbag,*

*the inflator is disposed at an upper end portion or a lower end portion of the airbag as viewed in the vertical direction of the vehicle;*

*the gas flow dividing portion has one end in the longitudinal direction of the vehicle which is connected to the front wall of the air bag in such a manner that a height of the one end is substantially constant and has an opposite end in the longitudinal direction of the vehicle which is connected to the rear wall of the air bag in such a manner that a height of the opposite end is substantially constant,*

*the gas flow from the inflator directly impinges upon the gas flow dividing portion, and*

*upon deployment, the airbag directly contacts the knees of the vehicle occupant, and the gas flow dividing portion suppresses inflation of the airbag in between both knees of the vehicle occupant.*

*35. The occupant knee protection system for a vehicle according to claim 34, wherein:*

*the gas flow dividing portion is a tether made of a woven fabric.*

*36. The occupant knee protection system for a vehicle according to claim 35, wherein:*

*the gas flow dividing portion has a communicating portion that communicates between one area and an other area within the airbag, both areas being separated by the gas flow dividing portion.*

*37. The occupant knee protection system for a vehicle according to claim 35, wherein:*

*the inflator is disposed vertically below the gas flow dividing portion.*

*38. An occupant knee protection system for a vehicle, comprising:*

*an inflator;*

*an airbag that is folded and stored in a part of the vehicle, that is inflated and deployed in front of knees of an occupant by a gas supplied from the inflator for protecting knees of the occupant; and*

*a gas flow dividing portion that divides a gas flow from the inflator in right and left directions of the vehicle and that is provided inside the airbag, wherein:*

*the gas flow dividing portion is formed in a predetermined length in a longitudinal direction of the vehicle, first and second end portions of the gas flow dividing portion being connected to first and second walls, that are arranged in the longitudinal direction of the vehicle, of the airbag,*

*the inflator includes a gas supply hole that faces the gas flow dividing portion in a state when the airbag is deployed,*

*the gas flow dividing portion is formed in a planar surface,*

*upon deployment, the airbag directly contacts the knees of the vehicle occupant, and the gas flow dividing portion suppresses inflation of the airbag in between both knees of the vehicle occupant.*

*39. The occupant knee protection system for a vehicle according to claim 38, wherein:*

*the gas flow dividing portion is a tether made of a woven fabric.*

*40. The occupant knee protection system for a vehicle according to claim 38 wherein:*

*the gas flow dividing portion has a communicating portion that communicates between one area and an other area within the airbag, both areas being separated by the gas flow dividing portion.*

*41. The occupant knee protection system for a vehicle according to claim 38, wherein:*

*the inflator is disposed vertically below the gas flow dividing portion.*

*42. The occupant knee protection system for a vehicle according to claim 38, wherein:*

*the gas flow dividing portion is formed in a tabular shape.*

*43. The occupant knee protection system for a vehicle according to claim 38, wherein:*

*the gas flow dividing portion is formed in a rectangular shape.*

*44. The occupant knee protection system for a vehicle according to claim 38, wherein:*

*the gas flow from the inflator directly impinges upon the gas flow dividing portion.*

*45. An occupant knee protection system for a vehicle, comprising:*

*an inflator;*

*an airbag that is folded and stored in a part of the vehicle, that is inflated and deployed in front of knees of an occupant by a gas supplied from the inflator for protecting knees of the occupant; and*

*a gas flow dividing portion that divides a gas flow from the inflator in right and left directions of the vehicle and that is provided inside the airbag, wherein:*

*the gas flow dividing portion is formed in a predetermined length in a longitudinal direction of the vehicle, front and rear end portions of the gas flow dividing portion being connected to front and rear walls, that are arranged in the longitudinal direction of the vehicle, of the airbag,*

*the inflator includes a gas supply hole that faces the gas flow dividing portion in a state when the airbag is deployed,*

*the gas flow dividing portion has one end in the longitudinal direction of the vehicle which is connected to the front wall of the air bag in such a manner that a height of the one end is substantially constant and has an opposite end in the longitudinal direction of the vehicle which is connected to the rear wall of the air bag in such a manner that a height of the opposite end is substantially constant,*

*upon deployment, the airbag directly contacts the knees of the vehicle occupant, and the gas flow dividing portion suppresses inflation of the airbag in between both knees of the vehicle occupant.*

*46. The occupant knee protection system for a vehicle according to claim 45, wherein:*

*the gas flow dividing portion is a tether made of a woven fabric.*

*47. The occupant knee protection system for a vehicle according to claim 45, wherein:*

*the gas flow dividing portion has a communicating portion that communicates between one area and an other area within the airbag, both areas being separated by the gas flow dividing portion.*

*48. The occupant knee protection system for a vehicle according to claim 45, wherein:*

*the inflator is disposed vertically below the gas flow dividing portion.*

*49. The occupant knee protection system for a vehicle according to claim 45, wherein:*

*the gas flow from the inflator directly impinges upon the gas flow dividing portion.*

*50. An occupant knee protection system for a vehicle, comprising:*

*an inflator;*

*an airbag that is folded and stored in a part of the vehicle, that is inflated and deployed in front of knees of an occupant by a gas supplied from the inflator for protecting knees of the occupant; and*

*a gas flow dividing portion that divides a gas flow from the inflator in right and left directions of the vehicle and that is provided inside the airbag, wherein:*

*the gas flow dividing portion is formed in a predetermined length in a longitudinal direction of the vehicle, first and second end portions of the gas flow dividing portion being connected to first and second walls, that are arranged in the longitudinal direction of the vehicle, of the airbag,*

*the inflator is disposed at an upper end portion or a lower end portion of the airbag as viewed in the vertical direction of the vehicle;*

*the inflator includes a gas supply hole arranged to emit the gas in a direction substantially perpendicular to a plane of the gas flow dividing portion in a state when the airbag is deployed,*

*the gas flow dividing portion is formed in a planar surface,*

*upon deployment, the airbag directly contacts the knees of the vehicle occupant, and the gas flow dividing portion suppresses inflation of the airbag in between both knees of the vehicle occupant.*

*51. An occupant knee protection system for a vehicle, comprising:*

*an inflator;*

*an airbag that is folded and stored in a part of the vehicle, that is inflated and deployed in front of knees of an occupant by a gas supplied from the inflator for protecting knees of the occupant; and*

*a gas flow dividing portion that divides a gas flow from the inflator in right and left directions of the vehicle and that is provided inside the airbag, wherein:*

*the gas flow dividing portion is formed in a predetermined length in a longitudinal direction of the vehicle, front and rear end portions of the gas flow dividing portion being connected to front and rear walls, that are arranged in the longitudinal direction of the vehicle, of the airbag,*

*the inflator is disposed at an upper end portion or a lower end portion of the airbag as viewed in the vertical direction of the vehicle;*

*the inflator includes a gas supply hole arranged to emit the gas in a direction substantially perpendicular to a plane of the gas flow dividing portion in a state when the airbag is deployed,*

*the gas flow dividing portion has one end in the longitudinal direction of the vehicle which is connected to the front wall of the air bag in such a manner that a height of the one end is substantially constant and has an opposite end in the longitudinal direction of the vehicle which is connected to the rear wall of the air bag in such a manner that a height of the opposite end is substantially constant,*

*upon deployment, the airbag directly contacts the knees of the vehicle occupant, and the gas flow dividing portion suppresses inflation of the airbag in between both knees of the vehicle occupant.*

*52. An occupant knee protection system for a vehicle, comprising:*

*an inflator;*

*an airbag that is folded and stored in a part of the vehicle, that is inflated and deployed in front of knees of an occupant by a gas supplied from the inflator for protecting knees of the occupant; and*

*a gas flow dividing portion that divides a gas flow from the inflator in right and left directions of the vehicle and that is provided inside the airbag, wherein:*

*the gas flow dividing portion is formed in a predetermined length in a longitudinal direction of the vehicle, first and second end portions of the gas flow dividing portion being connected to first and second walls, that are arranged in the longitudinal direction of the vehicle, of the airbag,*

*the inflator is disposed at an upper end portion or a lower end portion of the airbag as viewed in the vertical direction of the vehicle;*

*the inflator includes a gas supply hole that faces the gas flow dividing portion in a state when the airbag is deployed,*

*the gas flow dividing portion is formed in a planar surface,*

*upon deployment, the airbag directly contacts the knees of the vehicle occupant, and the gas flow dividing portion suppresses inflation of the airbag in between both knees of the vehicle occupant.*

*53. An occupant knee protection system for a vehicle, comprising:*

*an inflator;*

*an airbag that is folded and stored in a part of the vehicle, that is inflated and deployed in front of knees of an occupant by a gas supplied from the inflator for protecting knees of the occupant; and*

*a gas flow dividing portion that divides a gas flow from the inflator in right and left directions of the vehicle and that is provided inside the airbag, wherein:*

*the gas flow dividing portion is formed in a predetermined length in a longitudinal direction of the vehicle, front and rear end portions of the gas flow dividing portion being connected to front and rear walls, that are arranged in the longitudinal direction of the vehicle, of the airbag,*

*the inflator is disposed at an upper end portion or a lower end portion of the airbag as viewed in the vertical direction of the vehicle;*

*the inflator includes a gas supply hole that faces the gas flow dividing portion in a state when the airbag is deployed,*

*the gas flow dividing portion has one end in the longitudinal direction of the vehicle which is connected to the front wall of the air bag in such a manner that a height of the one end is substantially constant and has an opposite end in the longitudinal direction of the vehicle which is connected to the rear wall of the air bag in such a manner that a height of the opposite end is substantially constant,*

*upon deployment, the airbag directly contacts the knees of the vehicle occupant, and the gas flow dividing portion suppresses inflation of the airbag in between both knees of the vehicle occupant.*

*54. An occupant knee protection system for a vehicle, comprising:*

*an inflator;*

*an airbag that is folded and stored in a part of the vehicle, that is inflated and deployed in front of knees of an occupant by a gas supplied from the inflator for protecting knees of the occupant; and*

*a gas flow dividing portion that divides a gas flow from the inflator in right and left directions of the vehicle and that is provided inside the airbag, wherein:*

*the gas flow dividing portion is formed in a predetermined length in a longitudinal direction of the vehicle, first and second end portions of the gas flow dividing portion being connected to first and second walls, that are arranged in the longitudinal direction of the vehicle, of the airbag,*

*the inflator is disposed at an upper end portion or a lower end portion of the airbag as viewed in the vertical direction of the vehicle;*

*a direction of the gas flow from the inflator is in a vertical direction of the vehicle,*

*the gas flow dividing portion is formed in a planar surface,*

*upon deployment, the airbag directly contacts the knees of the vehicle occupant, and the gas flow dividing portion suppresses inflation of the airbag in between both knees of the vehicle occupant.*

*55. An occupant knee protection system for a vehicle, comprising:*

*an inflator;*

*an airbag that is folded and stored in a part of the vehicle, that is inflated and deployed in front of knees of an occupant by a gas supplied from the inflator for protecting knees of the occupant; and*

*a gas flow dividing portion that divides a gas flow from the inflator in right and left directions of the vehicle and that is provided inside the airbag, wherein:*

*the gas flow dividing portion is formed in a predetermined length in a longitudinal direction of the vehicle, front and rear end portions of the gas flow dividing portion being connected to front and rear walls, that are arranged in the longitudinal direction of the vehicle, of the airbag,*

*the inflator is disposed at an upper end portion or a lower end portion of the airbag as viewed in the vertical direction of the vehicle;*

*a direction of the gas flow from the inflator is in a vertical direction of the vehicle,*

*the gas flow dividing portion has one end in the longitudinal direction of the vehicle which is connected to the front wall of the air bag in such a manner that a height of the one end is substantially constant and has an opposite end in the longitudinal direction of the vehicle which is connected to the rear wall of the air bag in such a manner that a height of the opposite end is substantially constant,*

*upon deployment, the airbag directly contacts the knees of the vehicle occupant, and the gas flow dividing portion suppresses inflation of the airbag in between both knees of the vehicle occupant.*

* * * * *